United States Patent [19]

Mary et al.

[11] Patent Number: 4,755,965

[45] Date of Patent: Jul. 5, 1988

[54] PROCESSOR TO CARRY OUT DATA PROCESSING IN DIFFERENT MODES AND MULTIPLICATION DEVICE SUITABLE FOR SUCH A PROCESSOR

[75] Inventors: Luc Mary, Bures sur Yvette; Bahman Barazesh, Paris, both of France

[73] Assignee: Telecommunications Radioelectriques et Telephoniques T.R.T., Paris, France

[21] Appl. No.: 765,020

[22] Filed: Aug. 12, 1985

[30] Foreign Application Priority Data

Aug. 14, 1984 [FR] France ................................ 84 12799
Aug. 14, 1984 [FR] France ................................ 84 12801

[51] Int. Cl.[4] ............................................... G06F 9/00
[52] U.S. Cl. ................................................. 364/900
[58] Field of Search ............... 364/200, 900, 760, 751, 364/754

[56] References Cited

U.S. PATENT DOCUMENTS

| 4,298,936 | 11/1981 | Shapiro et al. | 364/200 |
| 4,344,129 | 8/1982 | Asada et al. | 364/200 |
| 4,484,301 | 11/1984 | Borgerding et al. | 364/760 |
| 4,589,067 | 5/1986 | Porter et al. | 364/200 |
| 4,608,634 | 8/1986 | Caudel et al. | 364/200 |

Primary Examiner—Gareth D. Shaw
Assistant Examiner—John G. Mills, III
Attorney, Agent, or Firm—James J. Cannon

[57] ABSTRACT

A processor for carrying out a calculation mode from a selected plurality of different modes. The processor includes a clock pulse generator which generates clock pulses in an order for processing subsequent data. A mode circuit is included for detecting a mode declaration instruction. The mode declaration instruction is decoded to select a different clock pulse cycle for each different mode selected. Mode control signals and the selected clock pulse cycle are applied to a control code and borrow management circuit to enable the arithmetic and logic unit to carry out one or more operations of the mode control signals.

10 Claims, 12 Drawing Sheets

FIG.13

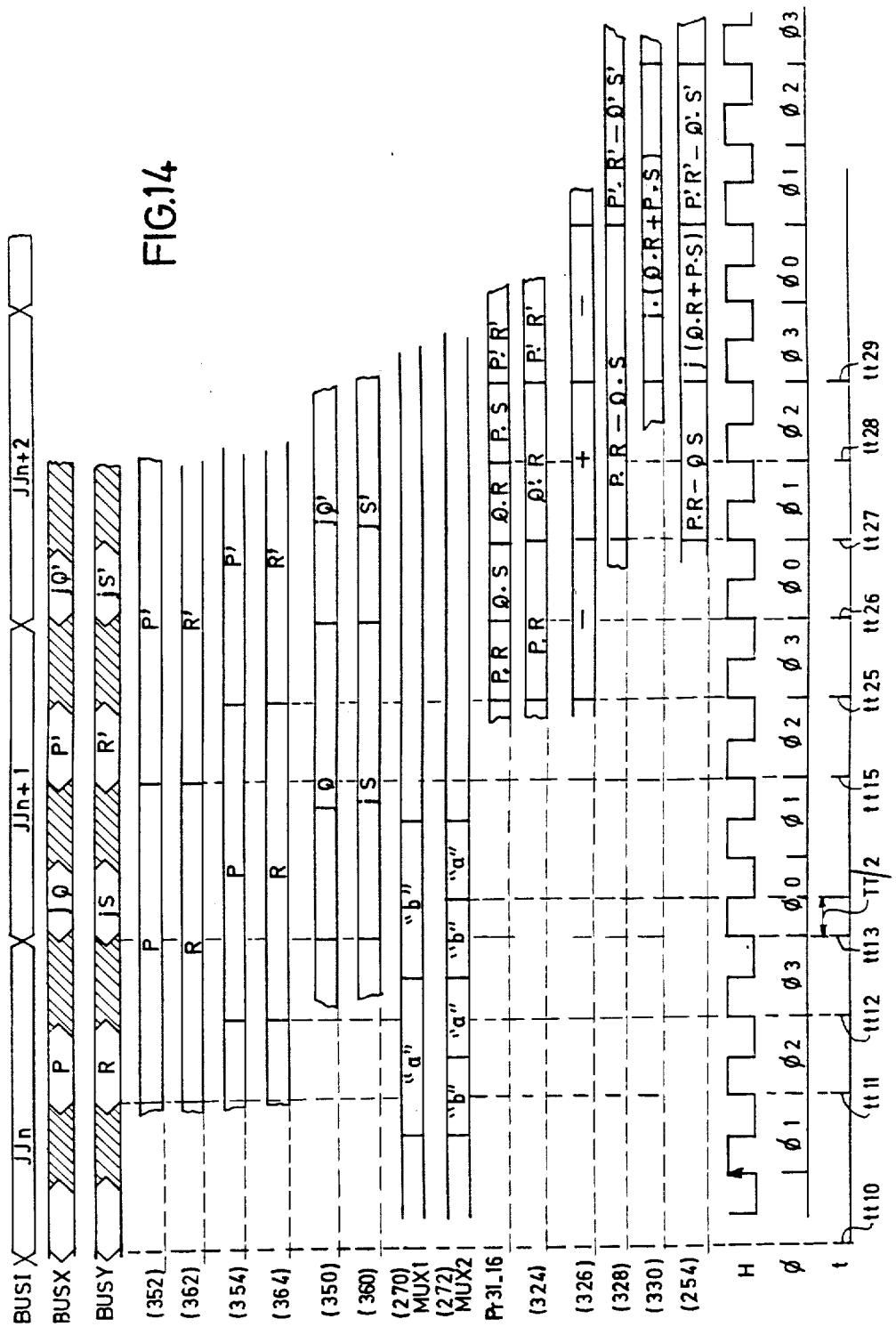

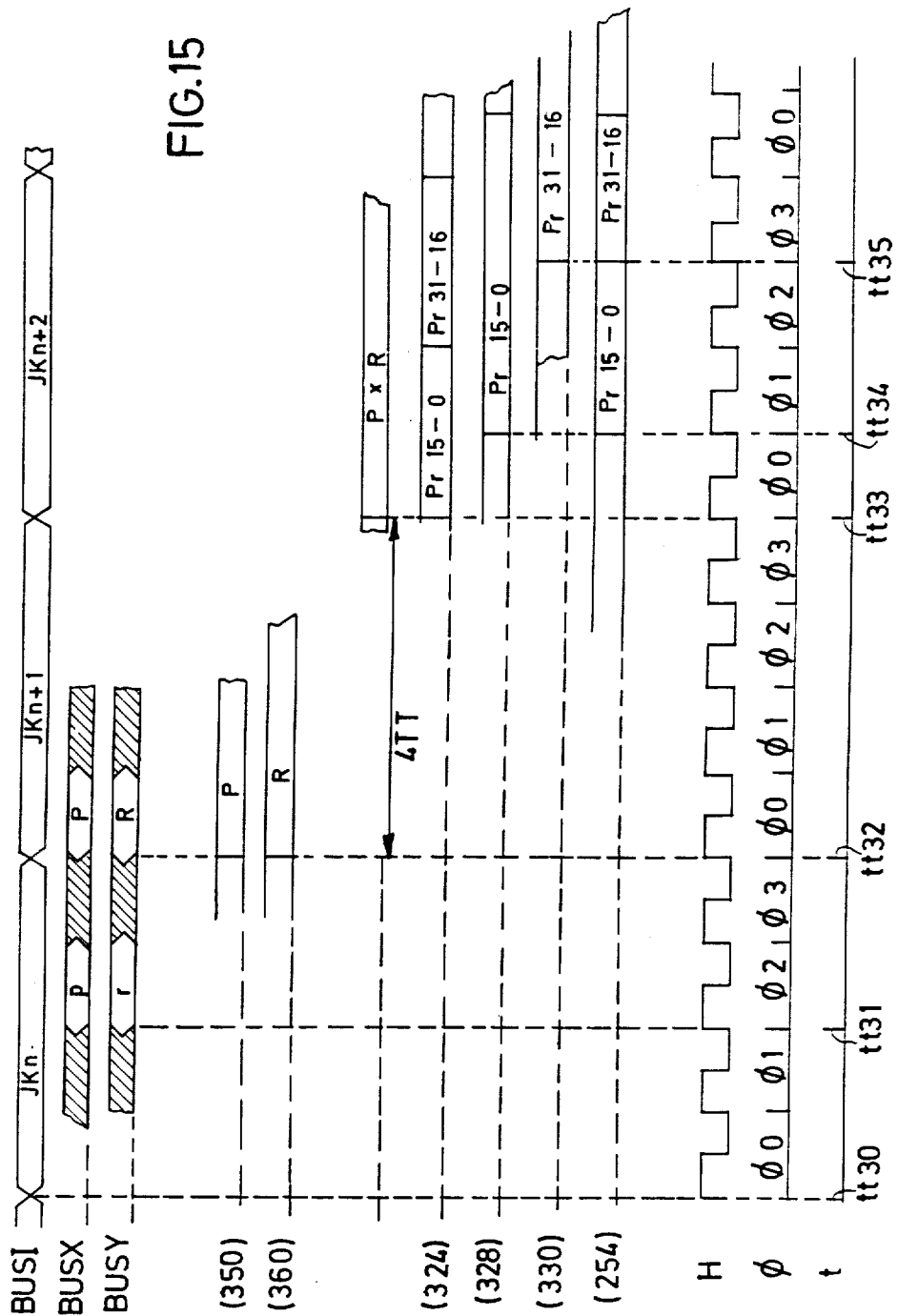

PROCESSOR TO CARRY OUT DATA PROCESSING IN DIFFERENT MODES AND MULTIPLICATION DEVICE SUITABLE FOR SUCH A PROCESSOR

BACKGROUND OF THE INVENTION

The present invention relates to a processor for carrying out, in different modes, the processing of data transmitted by at least one data line, according to instructions from a program-memory and placed in an instruction register, the processor includes means for causing processing phases triggered by a mode declaration instruction in order that the processing of the following data is executed in the previously declared mode.

Processors of the type mentioned above are well known devices and have innumerable applications. Among these are data transmissions by carrier in quadrature, i.e. the data are considered as complex values with a real part and an imaginary part, which does not exclude the ability for the processing to be carried out on real data in single and even in double precision.

The known processors carry out operations on real values in single precision in a relatively simple way, but when we wish to process complex data, it is then necessary to provide in the program-memory a complete set of instructions to detail all the arithmetic and logic operations and also the routing, in the working memories or in the operational registers, of various intermediate calculation results.

SUMMARY OF THE INVENTION

The present invention proposes a processor of the type mentioned in the preamble which enables, without necessitating many additional instructions, the processing of data in different modes.

For this, such a processor is remarkable in that an instruction line is connected to the instruction register, and in that a mode circuit is connected to the instruction line to detect a mode declaration instruction incorporated in the instructions stored in the program-memory and for causing mode signals transmitted to a clock device, for triggering processing phase signals determined by the detected mode, and in that the mode signals and the processing phase signals are transmitted to a control code and borrow management circuit which is connected to the instruction line.

The invention therefore contributes the advantage that the work of the programmer is considerably reduced since, when he is working in a mode other than single precision mode, a single instruction carries out a complete operation in the previously declared mode without him having to be concerned with various intermediate calculations imposed by this declared mode.

In the application envisaged above, the processings to be carried out involve numerous multiplications. In order that these can be executed in the various modes provided, the invention also procures a multiplication device particularly well suited to the processor that is the subject of the invention.

Such a multiplication device for carrying out multiplication of two operands is remarkable in that it includes series of input registers each allocated to an operand, provided to supply the operands according to the declared mode to the inputs of multiplication unit and to provide the result of the multiplication, a series of output registers working in conjunction with an addition-substraction unit implemented particularly in the complex mode.

The following description, accompanied by the appended drawings, all given by way of non-limiting example, will give a good understanding of how the invention can be embodied.

BRIEF DESCRIPTION OF THE DRAWING

FIG. 13 is a diagram showing the propagation of calculations in the multiplication unit that is part of the multiplication device.

FIG. 14 is a timing diagram showing the operation of the multiplication device in the complex mode.

FIG. 15 is a timing diagram showing the operation of the multiplication device in the double precision mode.

DESCRIPTION OF THE PREFERRED EMBODIMENT

Figure 1:
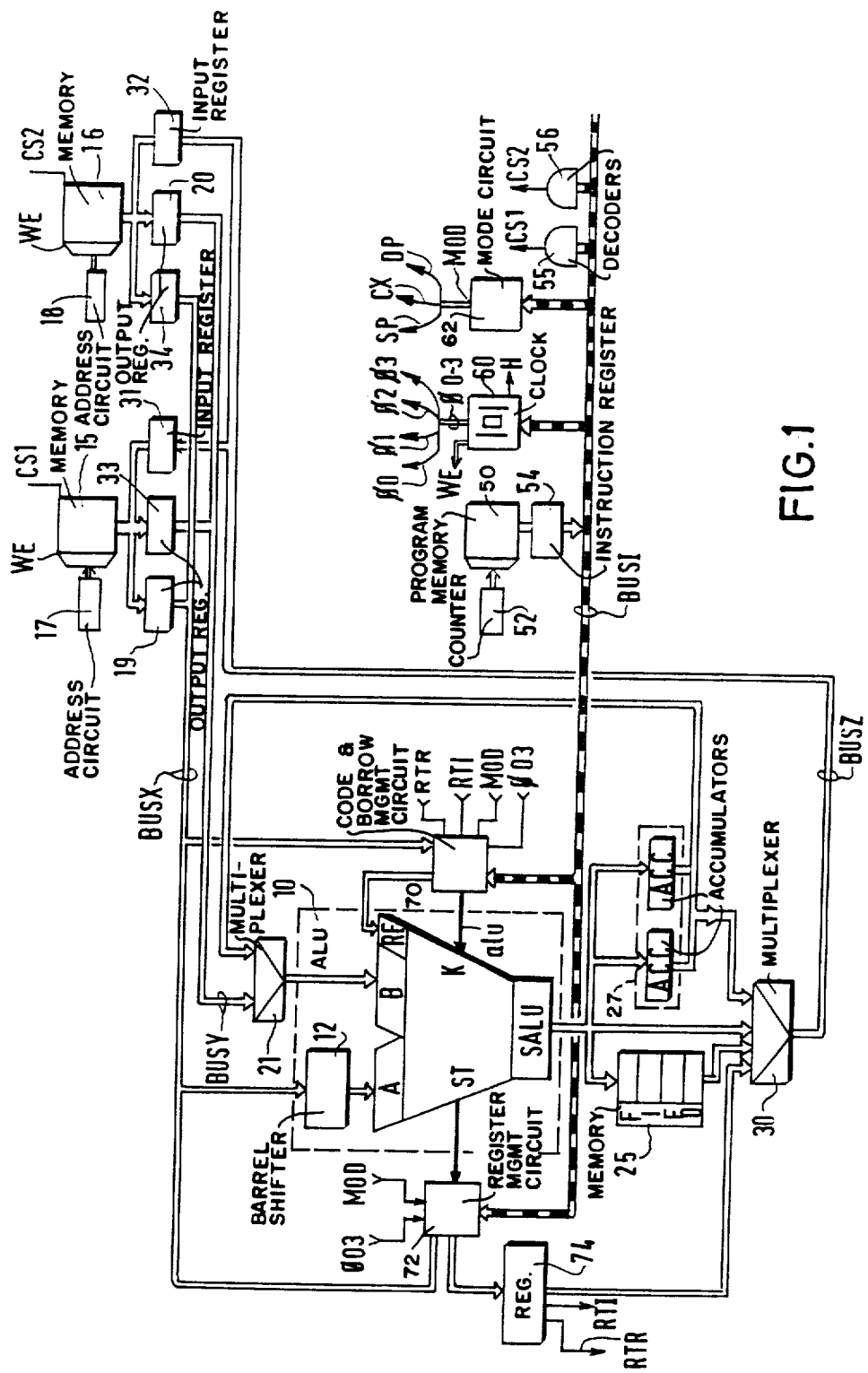
FIG. 1 is a diagram of a processor according to the invention.

The processor shown in FIG. 1 includes an arithmetic and logic unit 10. This unit is provided with a 16-bit operand input A, a 16-bit operand input B, a borrow input RE and a SALU output on which the results of the operations carried out appear in 16 bits. The nature of these operations depends on an "alu" code applied to the control code input K. The unit 10 is provided with an ST output to define the status code of the unit 10. To this unit 10 can be coupled on the operand input A, as indicated in this FIG. 1, a binary shifts unit 12 (BARREL SHIFTER).

Such a unit 10, which is presumed to be of standard type, coupled with the unit 12 can carry out the operations indicated in Table I below according to an "alu" code appearing in the form of a 5-bit binary word. A mnemonic code written in lower case letters corresponds with this binary word. The quantity (RTE) represents the value of the signal applied to input RE.

Table I below also gives information on the data supplied at output ST. Data "sr" gives the sign of the number at the SALU output, "rt" the value of the borrow; "z" indicates if the number at the SALU output is equal to zero, "ov" indicates if there is an overflow, "mov" is a memorized overflow, data "aov" represents the value SA15 ⊗ SA14 where SA15 and SA14 represent the most significant binary bits of the number contained in the SALU register and the symbol ⊕: the "exclusive OR" operation.

of other inputs. The line BUSZ is connected to the output of the FIFO memory, directly to the output of the unit 10, to the output of a register 74 and to the

TABLE I

| "" code | | | | | | | STATUS | | | | | |
|---|---|---|---|---|---|---|---|---|---|---|---|---|
| binary word | | | | | mnemonic | operations | sr | rt | z | ov | mov | aov |
| 0 | 0 | 0 | 0 | 0 | clr | 0 | 0 | 0 | 1 | 0 | — | 0 |
| 0 | 0 | 0 | 0 | 1 | add | B + A/16 | * | * | * | * | * | * |
| 0 | 0 | 0 | 1 | 1 | apbc | A + B + (RTE) | * | * | * | * | * | * |
| 0 | 0 | 1 | 0 | 1 | ambc | A + $\overline{B}$ + (RTE) | * | * | * | * | * | * |
| 0 | 1 | 0 | 0 | 0 | bmac | $\overline{A}$ + B + (RTE) | * | * | * | * | * | * |
| 0 | 0 | 1 | 1 | 1 | dld | 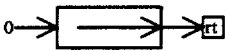 | * | * | * | 0 | — | * |
| 0 | 1 | 1 | 1 | 1 | dad | 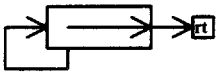 | * | * | * | 0 | — | * |
| 1 | 1 | 0 | 1 | 1 | dlg | 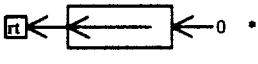 | * | * | * | 0 | — | * |
| 0 | 1 | 0 | 1 | 1 | dag | 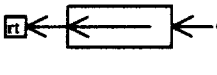 | * | * | * | *"1" | — | * |
| 1 | 0 | 1 | 1 | 1 | rod | 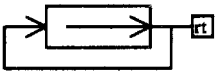 | * | * | * | 0 | — | * |
| 0 | 1 | 1 | 0 | 1 | lou | A + B | * | 0 | * | 0 | — | * |
| 0 | 1 | 1 | 1 | 0 | let | A · B | * | 0 | * | 0 | — | * |
| 0 | 1 | 1 | 0 | 0 | xou | A ⊕ B | * | 0 | * | 0 | — | * |
| 1 | 0 | 1 | 0 | 0 | tra | A | * | 0 | * | 0 | — | * |
| 1 | 0 | 1 | 0 | 1 | trb | B | * | 0 | * | 0 | — | * |
| 1 | 0 | 1 | 1 | 0 | cmp | $\overline{B}$ | * | 0 | * | 0 | — | * |
| 1 | 1 | 0 | 1 | 0 | dld 8 | same as dld but in 8 bits | * | * | * | 0 | — | * |
| 1 | 1 | 0 | 0 | 1 | dlg 8 | same as dlg but in 8 bits | * | * | * | 0 | — | * |

NOTE: The +, · and ⊕ signs respectively define the logic OR, logic AND and exclusive OR operations for codes "lou", "let", "xou".
"1" ov = SA14⊕SA15.

The operands A and B can come from memories 15 and 16 respectively to which are connected the addressing circuits 17 and 18. These memories receive a signal WE which puts them either in write mode or in read mode and a validation signal (CS1 and CS2 respectively). The output of memory 15 can be connected to the operand A input via an output register 19, a multiwire line (in this example 16) BUSX and the unit 12. Similarly the output of memory 16 can be connected to operand B input via an output register 20, a multiwire line (also 16) BUSY and a multiplexer 21. The results contained in the output register SALU can be stored in a memory 25 of First In First OUT (FIFO) type or in a set of accumulators 27. An output multiplexer 30 enables the routing of the results of the operations carried out by unit 10, stored or not in memory 25 or accumulators 27, in memories 15 and 16. In order to do this a multiwire line BUSZ is provided connected on the one hand to the output of the multiplexer 30 and on the other hand to the input registers 31 and 32 respectively allocated to memories 15 and 16. In addition, two additional output registers 33 and 34 are provided for memories 15 and 16 in order to establish a connection between their outputs and the BUSY and BUSX lines respectively.

The output of the unit 10 is connected to the input of an accumulator device 27, to the input of a FIFO memory 25 and to the input of a multiplexer 30 having a lot of other inputs. The line BUSZ is connected to the output of the FIFO memory, directly to the output of the unit 10, to the output of a register 74 and to the output of the accumulator device 27. It must be noticed that a connecting line is provided to connect directly the output of the accumulator device via multiplexer 21 with the operand input B of the unit 10.

By this connecting line the following advantage is provided for performing accumulation in pipe line operation. The number contained in accumulator device 27 is transmitted to the input B of the unit 10 without using the line buses BUSX, BUSY, or BUSZ. By this way, it is possible to start a new operation with data transmitted by these line buses, for instance a multiplication with the multiplier 250 (FIG. 9), without losing any processing time.

The complete processor operation of FIG. 1 is controlled by a succession of instructions contained in a program-memory 50 addressed by a program-counter 52. The instructions being executed are stored in an instruction register 54 the outputs of which are connected to a multiwire (in this example 32) BUSI line. It is from this BUSI line that it is possible to produce the signals CS1 and CS2 by means of two decoders 55 and 56 in order to recognize if memories 15 and 16 are or are not implicated by the instruction transmitted by this BUSI line.

The operation of the processor in FIG. 1 is carried out at the frequency of a clock devivce 60.

Figure 2:
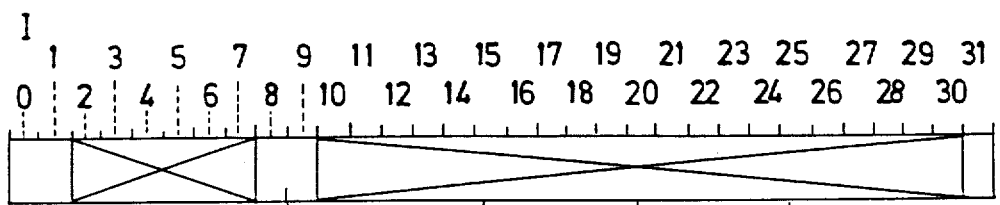
FIG. 2 represents the instruction format used for the processor of FIG. 1.

According to the invention, a processor for carrying out in different modes (particularly single precision mode, double precision mode, complex operations mode) is provided with means included in the clock device 60 for producing processing phases (∅0. ∅1, ∅2, ∅3 ...) triggered by a mode declaration instruction (see FIG. 2) and means (mode circuit 62) of providing mode indications so that the following instructions are executed in the declared mode. Each phase ∅0, ∅1, ∅2, ∅3 has a time duration equal to TT. These phase signals are transmitted by a set of wires referenced ∅0-3.

The mode declaration instruction is characterized by a code CI (11) placed at binary locations I0 and I1; at locations I8 and I9 are found the binary elements defining the mode.

| I8 = 0 | I9 = 1 | single precision mode |
| I8 = 1 | I9 = 0 | double precision mode |
| I8 = 1 | I9 = 1 | complex mode. |

Figure 3A:
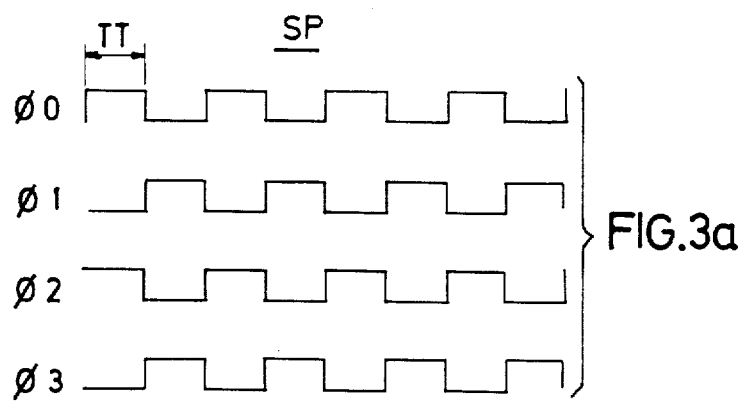
FIGS. 3a and 3b represent the appearance of the phase signals.
Figure 3B:
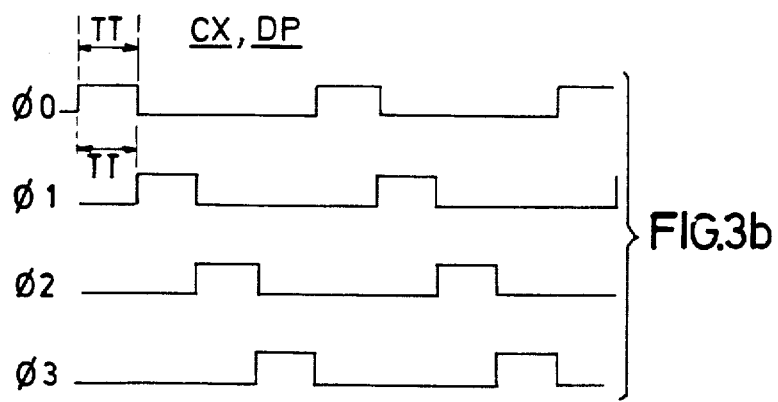

Thus circuit 62 by means of a decoding circuit and storage circuits, not represented, provides on one of the wires SP, CX, DP, connected to its output a permanent logic signal of logic value "1". The set of wires SP, CX, DP is referenced MOD. Circuit 60 provides signals of cyclic ratio equal to 0.5 the appearance of which is shown in FIG. 3a when in single precision mode and in FIG. 3b when in complex mode or in double precision mode. It is noted in FIG. 3a that the signals ∅0 are identical to the signals ∅2, these merged signals being subsequently referenced ∅02; similarly signals ∅1 are identical to signals ∅3, these merged signals being subsequently referenced by ∅13; signals ∅0, ∅2 are in opposite phase with respect to signals ∅1 and ∅3, the period during which these signals are active being equal to TT. This circuit 60 produces the WE signals for memories 15 and 16.

For the double precision mode and in complex operations the signals 00 to 03, all of cyclic ratio 0.25, are all phase shifted by a value equal to the duration TT during which they are active.

In order to make the arithmetic and logic unit 10 operate in these different modes, a command code and borrow management circuit has been provided referenced 70 and a status register management circuit, this register management circuit being referenced 72 in FIG. 1 while the status register is referenced 74. This register provides on the RTR and RTI wires borrow values which have different significance depending on mode.

Figure 4:
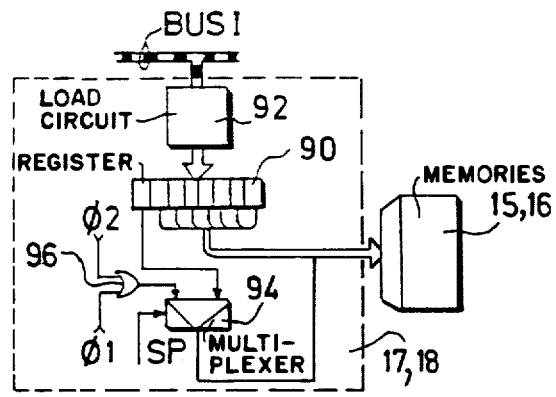
FIG. 4 represents the block diagram of the addressing circuits that are part of the processor of FIG. 1.

The addressing circuits 17 and 18 have been provided with means for carrying out the functions in the different envisaged modes, which is shown in FIG. 4.

Reference 90 in this FIG. 4 represents a register containing the address for memory 15 (16); this register 90 is loaded by means of a circuit 92 connected to the BUSI line, not detailed as not essential for the invention. All the binary elements contained in this register form the address code for memory 15 (16) in the single precision mode while in the complex mode or in double precision mode the least significant binary element is replaced by a clock signal, in which case the signal is provided by an "OR" gate 96 receiving on its inputs the signals ∅1 and ∅2. A two input multiplexer 94 of which one input is connected to the position of register 90 containing the least significant bit, of which the other input receives the signal ∅2 and of which the control receives the signal SP enables the carrying out of the change of addressing between the single precision mode on the one hand, and the complex and double precision modes on the other hand.

Thus, it is possible to address, in complex mode, the real and imaginary operands placed in successive addresses. For example, the real parts are placed in the even addresses and the imaginary parts in the odd addresses and this is done automatically. The same applies for the double precision mode for the least significant bits and the most significant bits.

Before describing the invention in greater detail, the constitution of the instructions relating to the invention is given. These instructions are characterized by initial codes CI1, CI2, CI3 and CI4 placed in the first positions of the instructions by way of indication. The various digital codes accompanied by a mnemonic code are given below as an indication.

| CI1 : 0 0      | : OPIN  |
| CI2 : 1 0 0    | : OPDI  |
| CI3 : 1 0 1 1 0| : OPIM  |
| CI4 : 1 0 1 1 1| : DECAL |

Table II gives the values of the binary elements in I10 to I14 of the different possible CODALUs.

TABLE II

| Mnemonic code | I10 | I11 | I12 | I13 | I14 | Comments |
|---|---|---|---|---|---|---|
| CLR | 0 | 0 | 0 | 0 | 0 | |
| ADD | 0 | 0 | 0 | 0 | 1 | B + A/16 |
| APB | 0 | 0 | 0 | 1 | 0 | A + B |
| APBC | 0 | 0 | 0 | 1 | 1 | A + B + (RTE) |
| AMB | 0 | 0 | 1 | 0 | 0 | A − B = A + B + 1 |
| AMBC | 0 | 0 | 1 | 0 | 1 | A + B + (RTE) |
| BMA | 0 | 0 | 1 | 1 | 0 | B − A = B + A + 1 |
| BMAC | 0 | 1 | 0 | 0 | 0 | B + A + (RTE) |
| DLD | 0 | 0 | 1 | 1 | 1 | Logic shift to right |
| DAD | 0 | 1 | 1 | 1 | 1 | Arithmetic shift to right |
| DLG | 1 | 1 | 0 | 1 | 1 | Logic shift to left |
| DAG | 0 | 1 | 0 | 1 | 1 | Arithmetic shift to left |
| ROD | 1 | 0 | 1 | 1 | 1 | Rotation to right |
| LOU | 0 | 1 | 1 | 0 | 1 | Logical OR |
| LET | 0 | 1 | 1 | 1 | 0 | Logical AND |
| XOU | 0 | 1 | 1 | 0 | 0 | Logical exclusive OR |
| TRA | 1 | 0 | 1 | 0 | 0 | Transfer of operand A |
| TRB | 1 | 0 | 1 | 0 | 1 | Transfer of operand B |
| CMP | 1 | 0 | 1 | 1 | 0 | B |
| STA | 0 | 1 | 0 | 0 | 1 | Transfer from bus BUSX into register 74 |
| DLD8 | 1 | 1 | 0 | 1 | 0 | Logic shift to right of 8 bits |
| DLG8 | 1 | 1 | 0 | 0 | 1 | Logic shift to left of 8 bits |
| CD1 | 1 | 0 | 0 | 0 | 0 | |
| CD2 | 1 | 0 | 0 | 0 | 1 | 10 control by bus BUSX |
| CD3 | 1 | 0 | 0 | 1 | 0 | |
| ADDC | 0 | 1 | 0 | 1 | 0 | Conjugate addition (complex mode) |
| NOP | 1 | 1 | 1 | 1 | 1 | |

Figure 6:
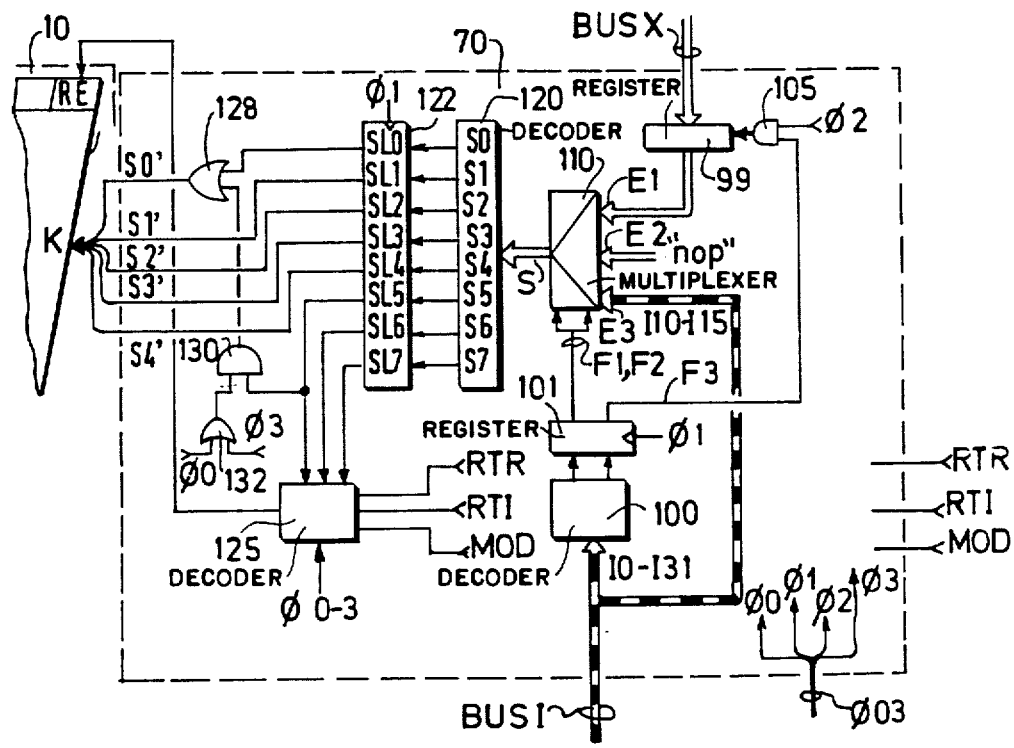
FIG. 6 represents the diagram of a control management circuit that is part of the processor of FIG. 1.

The control code and borrow management circuit 70 shown in detail in FIG. 6 enables the execution of the operations shown in Table III below.

TABLE III

| Mnemonic code | Single precision mode | Complex mode | Double precision |
|---|---|---|---|
| CLR | 0 | | |
| ADD | A + B/16 | Re(A) + [Re(B)/16] Im(A) + [Im(B)/16] | f(A) + F(B)/16 |
| APB | A + B | Re(A) + Re(B) Im(A) + Im(B) | F(A) + F(B) |
| ADDC | | Re(A) + Re(B) Im(A) − Im(B) | |
| AMB | A + $\overline{B}$ + 1 | Re(A) + $\overline{Re(B)}$ + 1 Im(A) + $\overline{Im(B)}$ + 1 | f(A) + $\overline{f(B)}$ + 1 F(A) + $\overline{F(B)}$ + RTR |
| BMA | $\overline{A}$ + B + 1 | $\overline{Re(A)}$ + Re(B) + 1 $\overline{Im(A)}$ + Im(B) + 1 | $\overline{f(A)}$ + f(B) + 1 $\overline{F(A)}$ + F(B) + RTR |
| AMBC | A + $\overline{B}$ + R | Re(A) + $\overline{Re(B)}$ + R Im(A) + $\overline{Im(B)}$ + 1 | f(A) + $\overline{f(B)}$ + R F(A) + $\overline{F(B)}$ + RTR |
| BMAC | $\overline{A}$ + B + R | $\overline{Re(A)}$ + Re(B) + RTR Im(A) + Im(B) + RTI | $\overline{f(A)}$ + f(B) + RTR F(A) + F(B) + RTR |
| APBC | A + B + R | Re(A) + Re(B) + RTR Im(A) + Im(B) + RTI | f(A) + f(B) + RTR F(A) + F(B) + RTR |
| LOU | A + B | Re(A) + Re(B) Im(A) + Im(B) | f(A) + f(B) F(A) + F(B) |
| LET | A · B | Re(A) · Re(B) Im(A) · Im(B) | f(A) · f(B) F(A) · F(B) |
| XOU | A ⊕ B | Re(A) ⊕ Re(B) Im(A) ⊕ Im(B) | f(A) ⊕ f(B) f(A) ⊕ f(B) |
| TRA | A | Re(A) Im(A) | f(A) F(A) |
| TRB | B | Re(B) Im(B) | f(B) F(B) |
| CMP | B | Re(B) Im(B) | f(B) F(B) |

| | | | |
|---|---|---|---|
| DLD |  | 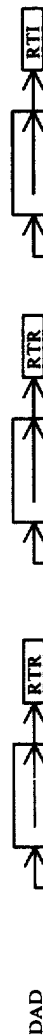 |  |
| DAD |  |  |  |
| DLG |  |  |  |
| DAG |  |  |  |
| ROD |  |  |  |

| DLD8 | same as DLD but /8 bits | same as DLD but in 8 bits | |
| DLG8 | same as DLG | same as DLG but in 8 bits | |
| NOP | no operation | no change in status | |

Re(A): real part of A which occurs before the imaginary part of A; Im(A): imaginary part of A: (f(A): significant part of A which occurs after the least significant part of A: f(f(A): significant part of A — ditto for Re(B), Im(B), F(B) and f(B)
RTR: borrow for real part, also used for single and double precision modes.
RTI: borrow for imaginary part The input code to be processed by circuit 70 comes either from the BUSI line or from the BUSX line via a register 99.

However, the code coming from the BUSX line is subject to dependency on the CODALU code coming from the BUSI line. These CODALU codes are decoded by a decoding circuit 100 (FIG. 6) followed by a register 101 in order to provide at the time fixed by the signal ∅1 the result of the decoding (namely the signals F1, F2 and F3). The purpose of this circuit 100 is to decode the following CODALU codes.

TABLE IV

| CODALU | Operation |
|---|---|
| CD1 | loading of 99 and execution defined by the previous content of register 99. |
| CD2 | no loading of 99 and execution defined by the previous content of register 99. |
| CD3 | loading of 99 and no execution (NOP). |

The signal F3 is in the 1 state when dealing with CODALU: CD1 and CD3. This signal opens an AND gate 105 so that the data carried by the BUSX line is stored in register 99 when the ∅2 signal applied to the other input of the gate 105 becomes active. The signals F1 and F2 act on the control of a multiplexer 100 with three inputs E1, E2 and E3. The group of outputs of register 99 is connected to input E1, to input E2 are permanently applied the signals corresponding to the "nop" code signifying that no operations are required to be carried out by unit 10 and on input E3 are connected the wires of the BUSI line corresponding to positions I10 to I14 of the instructions. Thus for code CODALU=CD1 there will be a connection between E1 and the outputs S of the multiplexer 110, for CODALU=CD2 there will be a connection between E1 and the output S of the multiplexer 110, for CODALU=CD3 a connection between E2 and the output S of the multiplexer 110 and for CODALU=CD1, CD2 and CD3 the connection between E3 and S is made.

The various codes at the output of the multiplexer 110 are then decoded by a decoder 120 which provides signals on different outputs S0 to S7. These signals S0 to S7 are applied to a "0 flip-flop" register 122 receiving on its clock input a signal ∅1.

The register makes the signals on its output SL0 to SL7 correspond with the signals present on outputs S0 to S7.

The code applied to the K input of unit 10 is formed from the signals present at the output of a two input OR gate 128 and at the outputs SL1 to SL4. One input of OR gate 128 receives the signal available at the output of SL0 and the other receives the output signal from an AND gate 130 having two inputs one of which receives the signal SL5 and the other the output signal of an OR gate 132; this OR gate 132 receives on its two inputs the signals ∅0 and ∅3 respectively. The signals applied to the K input are named signals S0', S1', S2', S3', S4'.

The decoder circuit 125 manages the borrow for the RE input of unit 10, it receives the signals SL5, SL6, SL7 and the signals RTR and RTI from the status register 74 and the MOD signal.

If we call SI0, SI1, SI2, SI3 and SI4 the code applied to circuit 120, this is wired to make the following operations:

S0=SIO
S1=SI1
S2=SI2
S3=SI3
S4=SI4 i.e. these bits are practically directly transmitted to circuit 10.

The signal S5 is active only in the complex mode and only for the operation A+B*. B* represents the conjugate value of B, the CODALU nmemonic code is ADDC and the corresponding binary word (0 1 0 1 0) therefore:

$$S5 = \overline{I10} \cdot I11 \cdot \overline{I12} \cdot I13 \cdot \overline{I14}$$

The signal S6 is active when the CODALU code involves the participation of a borrow, i.e. the codes AMB, BMA, APBC, BMAC, APBC and ADDC.

Signal S7 is active for the CODALU codes involving the borrow "1" i.e. codes AMB, BMA.

The borrow management circuit 125 which is formed by a programmable logic network and which is connected to wires RTR, RTI, MOD and ∅0-3 can easily be programmed, just like circuit 120, using the tables below. It is understood that RTR transmits the value of the borrow in single precision and double precision mode and the value of the real borrow in complex mode and that RTI transmits the value of the imaginary borrow in complex mode.

TABLE V

| SINGLE PRECISION MODE | | | |
|---|---|---|---|
| MNEMONIC code | Borrow in RE | Code in K | Comments |
| CLR | 0 | clr | |
| ADD | 0 | add | |
| APB | 0 | apbc | |
| ADDC | — | — | Prohibited operation |
| AMB | 1 | ambc | |
| BMA | 1 | bmac | |
| AMBC | RTR | ambc | |
| BMAC | RTR | bmac | |
| APBC | RTR | apbc | |
| LOU | 0 | lou | |
| LET | 0 | let | |
| XOU | 0 | xou | |
| TRA | 0 | tra | |
| TRB | 0 | trb | |
| CMP | 0 | cmp | |
| DLD | 0 | dld | |
| DAD | 0 | dad | |
| DLG | 0 | dlg | |
| DAG | 0 | dag | |
| ROD | 0 | rod | |
| DLD8 | 0 | dld8 | |
| DLG8 | 0 | dlg8 | |
| NOP | 0 | nop | |

TABLE VI

| | DOUBLE PRECISION MODE | | | | |
|---|---|---|---|---|---|
| MNEMONIC code | Borrow in RE | | Code in K | | Comments |
| | ∅1 + ∅2 | ∅0 + ∅3 | ∅1 + ∅2 | ∅0 + ∅2 | |
| CLR | | | ← clr → | | |
| ADD | | | ← add → | | |
| APB | 0 | RTR | ← apbc → | | |
| ADDC | — | — | — — | | Prohibited operation |
| AMB | 1 | RTR | ← amb → | | |

TABLE VI-continued

| MNEMONIC code | DOUBLE PRECISION MODE | | | | Comments |
|---|---|---|---|---|---|
| | Borrow in RE | | Code in K | | |
| | ∅1 + ∅2 | ∅0 + ∅3 | ∅1 + ∅2 | ∅0 + ∅2 | |
| BMA | 1 | RTR | ← bma → | | |
| AMBC | RTR | RTR | ← ambc → | | |
| BMAC | RTR | RTR | ← bmac → | | |
| APBC | RTR | RTR | ← apbc → | | |
| LOU | 0 | 0 | ← lou → | | |
| LET | 0 | 0 | ← let → | | |
| XOU | 0 | 0 | ← xou → | | |
| TRA | 0 | 0 | ← tra → | | |
| TRB | 0 | 0 | ← trb → | | |
| CMP | 0 | 0 | ← cmp → | | |
| DLD | | | | | ⎫ |
| DAD | | | | | ⎪ |
| DLG | | | | | ⎬ Operations not provided in double precision mode |
| DAG | | | | | ⎪ |
| ROD | | | | | ⎪ |
| DLD8 | | | | | ⎪ |
| DLG8 | | | | | ⎭ |
| NOP | 0 | 0 | ← nop → | | |

TABLE VII

| MNE-MONIC code | Borrow in RE | | Code in K | | Comments |
|---|---|---|---|---|---|
| | ∅1 + ∅2 | ∅0 + ∅3 | ∅1 + ∅2 | ∅0 + ∅3 | |
| CLR | 0 | 0 | clr | clr | |
| ADD | 0 | 0 | add | add | |
| APB | 0 | 0 | apbc | apbc | |
| ADDC | 0 | 1 | apbc | bmac | See gate 128 |
| AMB | 1 | 1 | ambc | ambc | |
| BMA | 1 | 1 | bmac | bmac | |
| AMBC | RTR | RTI | ambc | ambc | |
| BMAC | RTR | RTI | bmac | bmac | |
| APBC | RTR | RTI | apbc | apbc | |
| LOU | 0 | 0 | lou | lou | |
| LET | 0 | 0 | let | let | |
| XDU | 0 | 0 | xou | xou | |
| TRA | 0 | 0 | tra | tra | |
| TRB | 0 | 0 | trb | trb | |
| CMP | 0 | 0 | cmp | cmp | |
| DLD | 0 | 0 | dld | dld | |
| DAD | 0 | 0 | dad | dad | |
| DLG | 0 | 0 | dlg | dlg | |
| DAG | 0 | 0 | dag | dag | |
| ROD | 0 | 0 | rod | rod | |
| DLD8 | 0 | 0 | dld8 | dld8 | |
| DLG8 | 0 | 0 | dlg8 | dlg8 | |
| NOP | 0 | 0 | nop | nop | |

Figure 5:
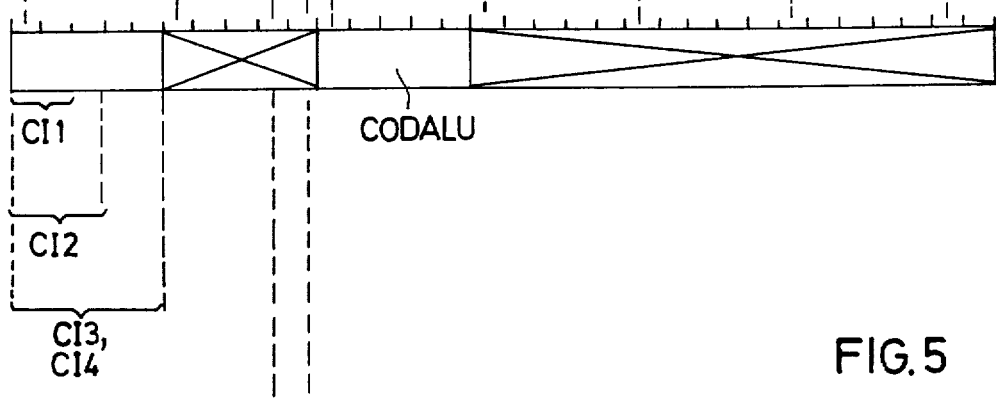
FIG. 5 represents the format of other instructions used for the processor of FIG. 1.
Figure 11:
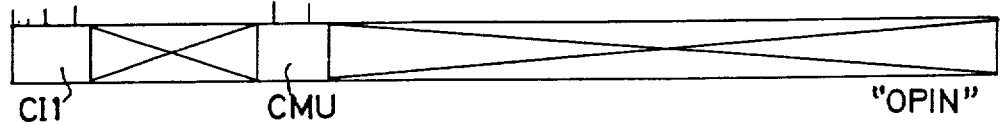
FIG. 11 represents the format of an instruction implying a multiplication to be carried out.
Figure 7:
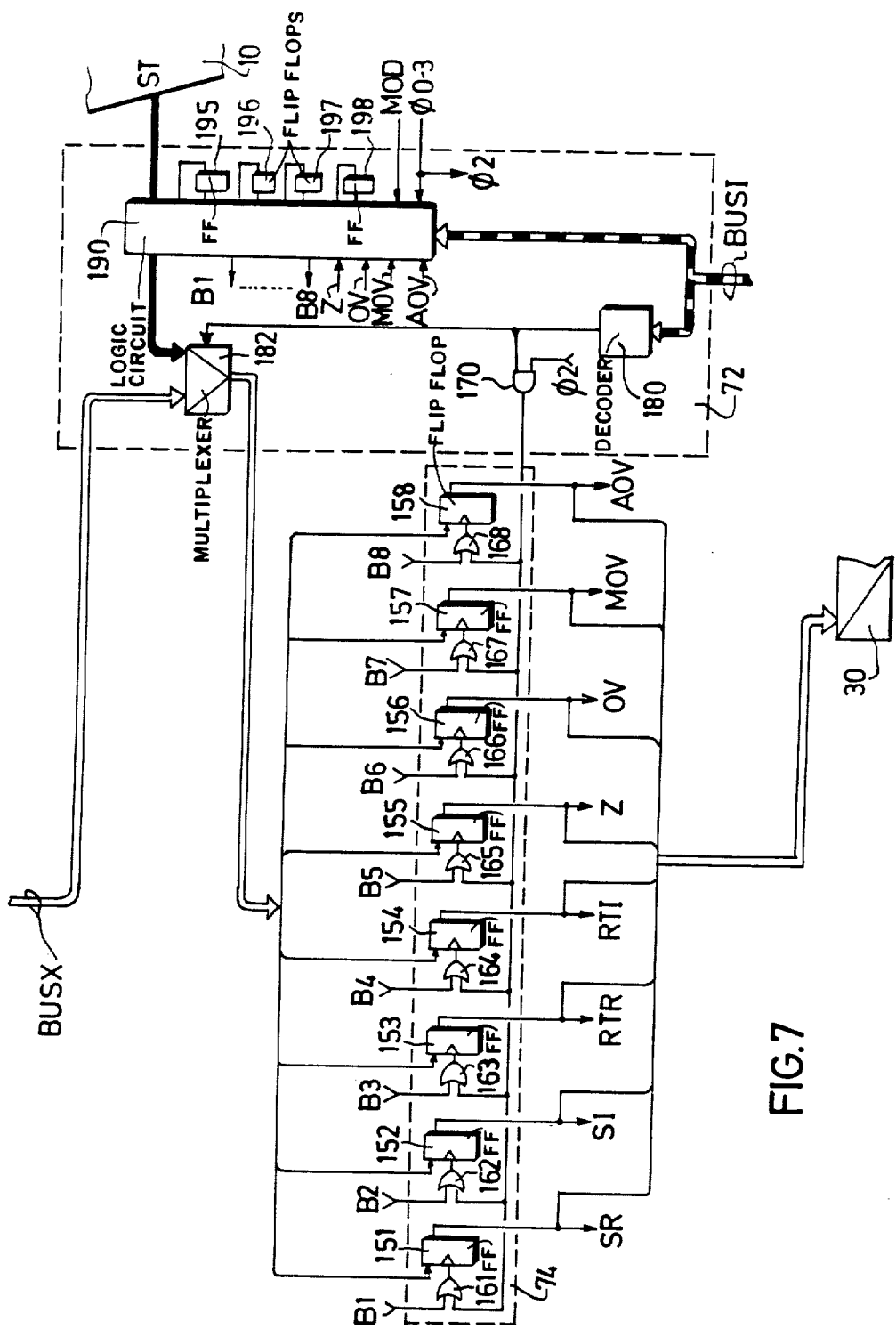
FIG. 7 represents the status register as well as its management circuit, all being part of the processor of FIG. 1.

FIG. 7 shows in detail the status register 74 and its management circuit 72. The status data come from unit 10. These data are, we recall "sr", "rt", "z", "ovf", "mov", "aov". These various data must be stored in flip-flops 151, 152, . . . 158 judiciously according to the operational mode. In order that the data are recorded it is necessary that a signal be applied to their clock input; this signal is provided by the OR gates 161 to 168, all having two inputs. The first inputs of these OR gates are connected to the output of an AND gate 170 having two inputs and being part of the management circuit 72. One of these inputs receives the signal ∅2 and the other input receives the output signal of a decoder circuit 180 which, connected to the BUSI line, provides an active output signal when in the instructions of the type shown in FIG. 5 we find the STA code at the CODALU location (see Table II). The output signal of the decoder circuit 180 is also applied to the control of a multiplexer 182 having two inputs; one of its inputs is connected to the BUSX line so that the active signal at the output of the decoder circuit 180 branches the data inputs of the flip-flops 151 to 158 onto the BUSX line and the data transmitted by this line are then stored in the said flip-flops.

The other input of the multiplexer 182 is connected to the status output ST of unit 10 by means of a logic circuit 190. This logic circuit 190 also provides signals B1 to B8 for the second inputs of OR gates 161 to 168. This logic circuit 190 receives the data coming from the BUSI line, the clock signals ∅0-3 and the operational mode data MOD. This logic circuit is associated with flip-flops 195, 196, 197 and 198.

The logic circuit 190 can easily be designed from the following considerations:

(A) in single precision mode:

"sr" at the ST output is loaded in flip-flop 151 (SR) by an ∅3 edge for all CODALU codes except NOP, CD3, STA;

loading is prohibited for flip-flop 152 (SI);

"rt" at the ST output is loaded into flip-flop 153 (RTR) by an ∅3 edge for all CODALU codes except NOP, CD3, STA;

loading is prohibited for flip-flop 154 (RTI);

"z" at the ST output is loaded into flip-flop 155 (Z) by an ∅3 rising edge for all CODALU codes except NOP, CD3, STA;

"ov", "mov", "aov" are loaded respectively into flip-flops 156 (OV), 157 (MOV) and 158 (AOV) by an ∅3 rising edge except for codes NOP, CD3, STA.

(B) in complex mode:

"sr" is loaded on the one hand into flip-flop 151 (SR) by an ∅3 edge and on the other hand in flip-flop 152 (SI) by an ∅1 edge for all CODALU codes except NOP, CD3, STA;

"rt" is loaded on the one hand in flip-flop 153 (RTR) by an ∅3 edge and on the other hand in flip-flop 154 (RTI) by an ∅1 edge for all CODALU codes except NOP, CD3, STA;

"ov", "mov", "aov" are first loaded respectively into registers 196, 197 and 198 by phase ∅3, then on ∅1 we load (OV+ov) into flip-flop 156, (AOV+aov) into flip-flop 157 and (MOV+mov) into flip-flop 158.

"z" is loaded into flip-flop 195 at ∅3 and the output signal Z is combined with the signal z at ∅1 such that the flip-flop 195 is loaded with the value:

$$Z.z \text{ at } \emptyset 1$$

(the value "1" of Z thus indicates that the real and imaginary values are both equal to 0).

(C) in double precision mode:

"sr" and "rt" are loaded into flip-flops 151 (SR) and 153 (RTR) at the ∅1 edge;

"ov", "mov" and "aov" are loaded in flip-flops 156 (OV), 157 (MOV) and 158 (AOV) at the edge of ∅1;

for "z" we again use flip-flop 195 loaded first at ∅3 by the least significant zero, then the result of the logic AND operation between the output signal of this flip-flop and the most significant value of z is loaded into flip-flop 195.

FIGS. 8a and 8b represent timing diagrams showing the running of the execution of an instruction in single precision mode in a and in complex mode and double precision mode in b.

Figure 8:
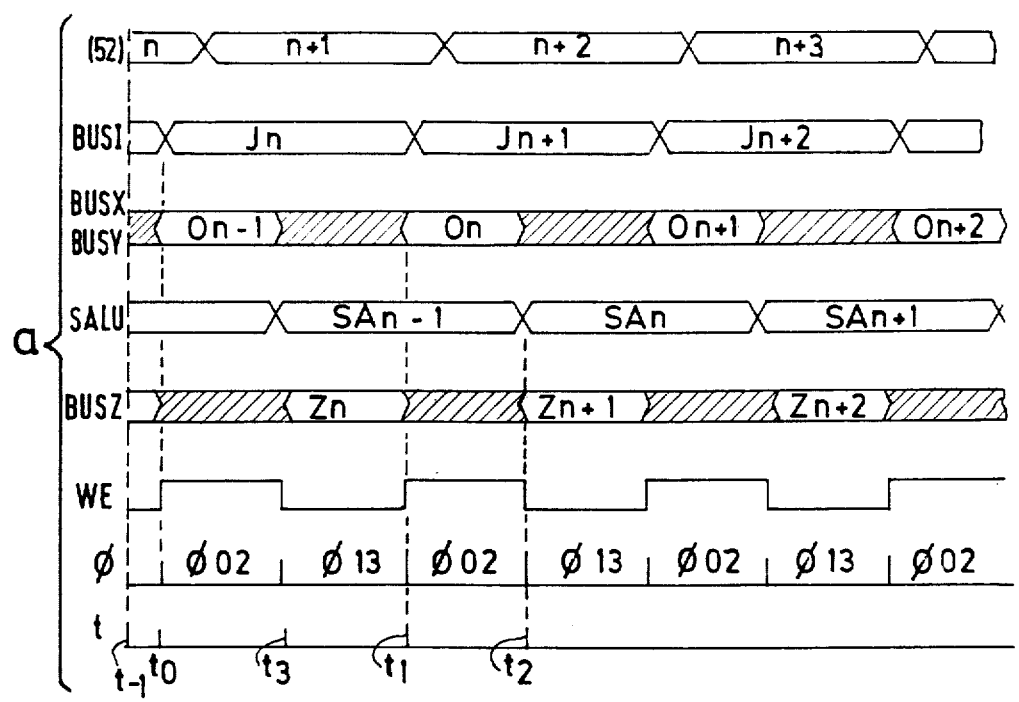
FIG. 8 represents a timing diagram to be used in the explanation of the operation of the processor of FIG. 1.
Figure 8:
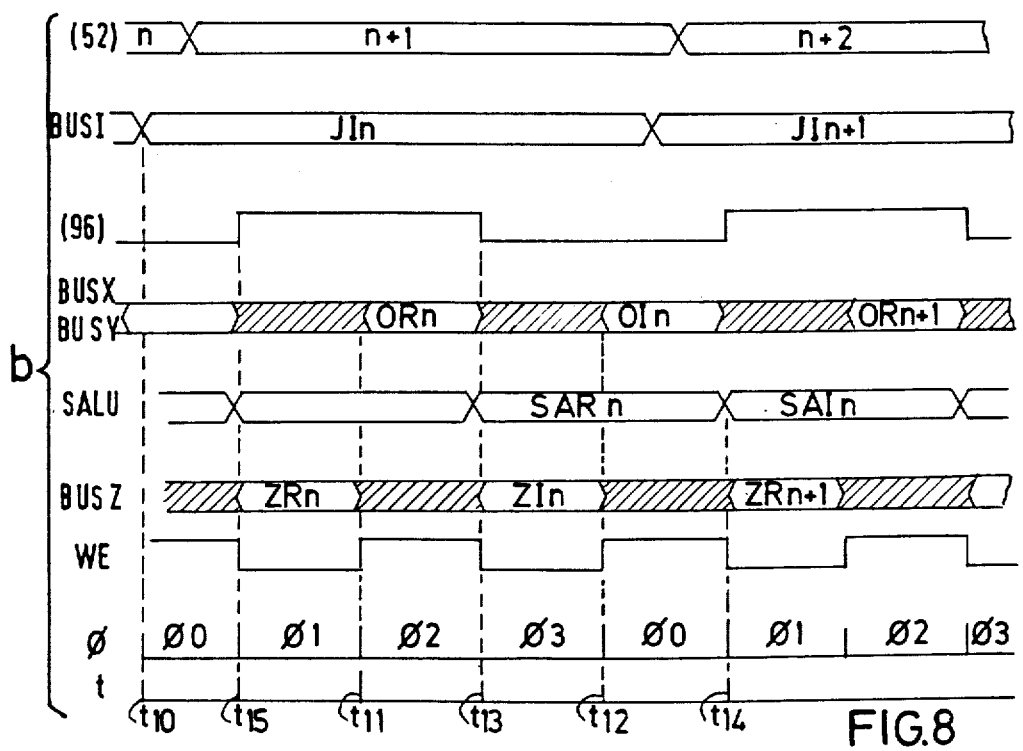

In the case of single precision mode, the instruction Jn occurs at time to, this instruction coming from the program-memory 50 allocated to an address "n" given by the content of the program counter 52; this address was produced at time $t_{-1}$ occurring before time to. From time to data are transmitted on the BUSX and BUSY lines throughout the phase ∅0-2. During phase ∅13 which follows, as well as elsewhere during all ∅13 phases, the BUSX and BUSY lines are not available and are placed in the pre-loaded state. The instruction Jn implicates On operands which are transmitted by the BUSX and BUSY lines at time t1, the start of a phase ∅02. The result SAn of the operation commanded by the Jn instruction is again found in the output register SALU of unit 10 at time t2. The Jn instruction can also involve transfers of data available at the output of the multiplexer 30 to memories 15 and 16. The Zn data are then transferred from time t3, the start of a phase ∅13; it is during the ∅13 phases that the BUSZ line is available, the ∅02 phase being occupied with the pre-load state. In FIG. 8 has been represented a signal WE which defines the writing of memories 15 and 16. These memories are put into the read or write state in an instruction cycle. The operation can therefore be summarized as follows:

The program-counter 52 is incremented at the start of each instruction in order to prepare the address of the next instruction (n+1) and to address the program-memory in parallel with the execution of instruction Jn. The source operands of the instruction Jn are available at the next cycle and the arithmetic and logic operand of the Jn instruction is also put into effect at cycle (n+1).

The result of this is that the datum saved by the BUSI line on instruction Jn is the result of a previous calculation. There therefore exists 3 pipeline levels in the processor and 3 operations are carried out simultaneously.

the incrementation of the program-counter 52 for the instruction Jn+1, the search for operands of the instruction Jn, and the operation of unit 10 requested by the instruction J(n−1).

The operation of the processor in complex and double precision modes is explained in FIG. 8b.

The BUSX and BUSY lines transmit data during phases ∅0 and ∅2 while the BUSZ line transmits them during phases ∅1 and ∅3. We assume that at time t10 an instruction JIn appears which must be executed in complex or double precision mode. This instruction makes the data ORn which represent the real parts of the operands in the complex mode or the least significant part in the double precision mode appear on lines BUSX and BUSY at t11; then during the following phase ∅0 starting at time T12 the BUSX and BUSY lines transmit the imaginary parts or the most significant parts depending on complex mode or double precision mode.

It is appropriate to note that the address codes of memories 15 and 16 change. The least significant binary element is changed by the output signal of gate 96 (see FIG. 4) such that the address code is not the same during two consecutive ∅2 and ∅0 phases. The output register SALU of unit 10 supplies at time t13 the result of the operation on the real parts or on the least significant bits during phase ∅3 and at time t14 the imaginary parts and the most significant bits during phase ∅1.

The BUSZ line transmits the real parts or the least significant bits during phase ∅1 which starts at time t15, this transmission being commanded by instruction JIn; the imaginary parts and the most significant bits are transmitted during phase ∅3 starting at time T13. The various memories 15 and 16 are put in read mode or in write mode in an instruction cycle (signal WE authorizes the writing of data into the memory).

The operation in complex and double precision modes is very similar to the single precision mode with the following difference: the searching for the real parts or the least significant bits for the JIn instruction is carried out at the same time as the calculation of imaginary parts or of the most significant bits of the JIn-1 instruction.

Figure 9:
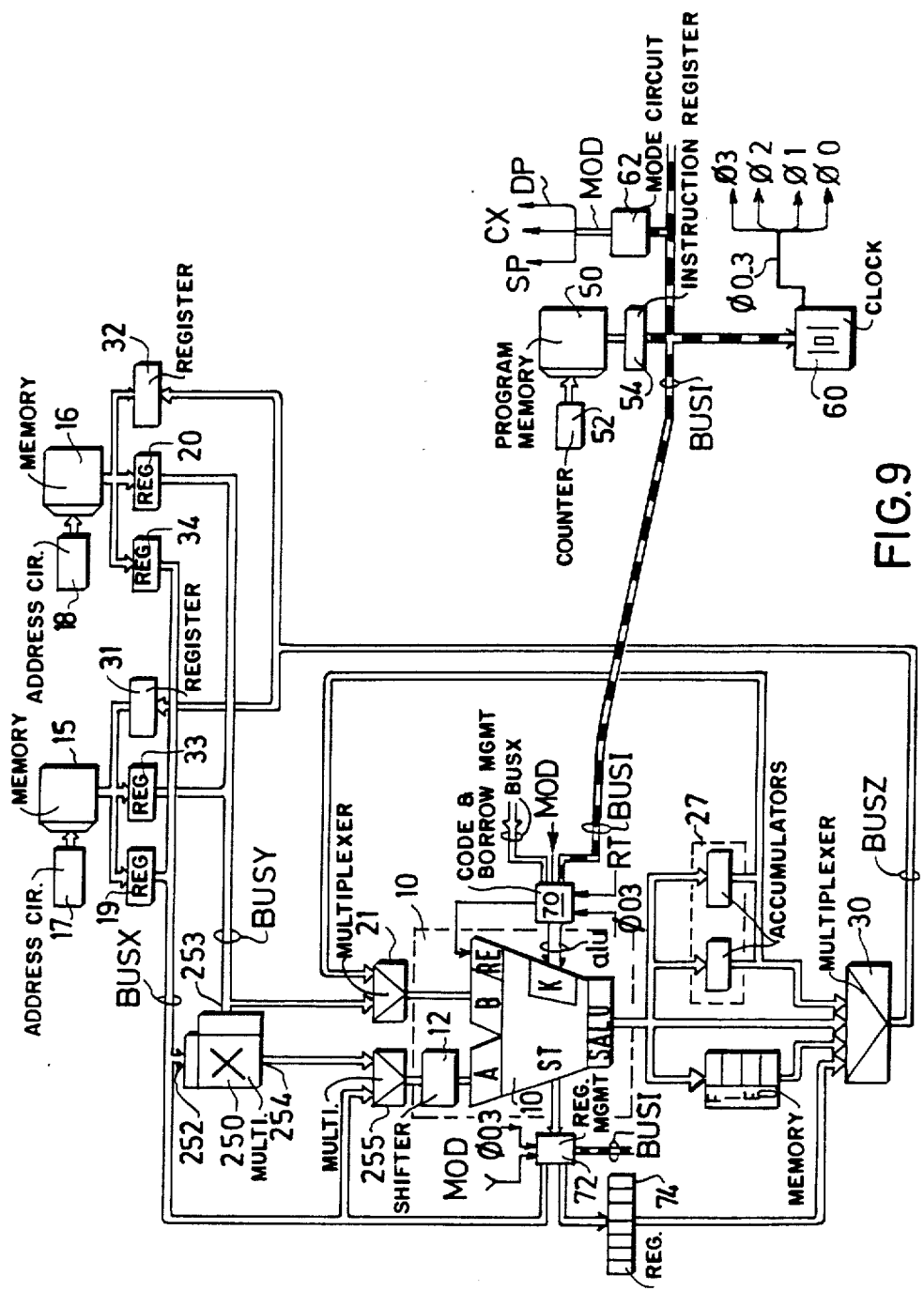
FIG. 9 represents a variant of a processor with a multiplication device, all according to the invention.

FIG. 9 shows an example of a preferred embodiment of a processor according to the invention. This embodiment differs from that already described by the presence of a multiplication device 250 functioning with unit 10 in "PIPE-LINE". This device 250 is provided with two inputs 252 and 253 for 16-bit operands connected to the BUSX and BUSY lines. Output 254 of device 250 is connected to one of the two inputs of a multiplexer 255 of which the output is connected to the operand input A of unit 10; the second input of this multiplexer is connected to the BUSX line.

Figure 10:
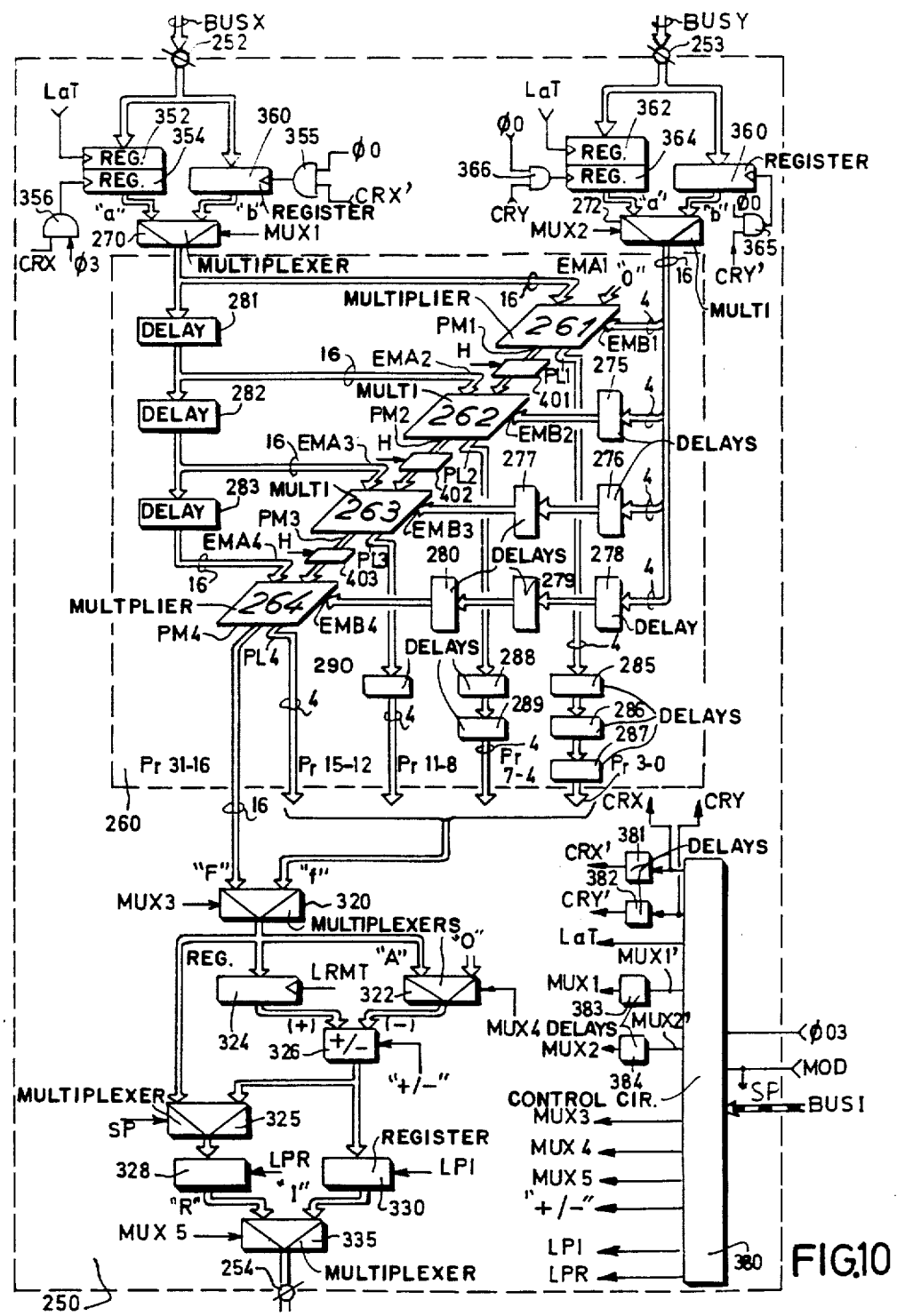
FIG. 10 represents the diagram of the multiplication device according to the invention.

FIG. 10 shows in detail the structure of the multiplication devices 250. It is formed from a multiplication unit 260 formed of four multiplication sub-units 261, 262, 263 and 264; these sub-units carry out the operations of multiplication on a first 16-bit operand applied at their inputs EMA1, EMA2, EMA3 and EMA4 respectively with a second 4-bit operand applied to their input EMB1, EMB2, EMB3 and EMB4 respectively; these sub-units 261 to 264 are of standard design and there is no need to describe them in detail; however if required reference can be made to M. Bellanger's work entitled "Digital signal processing" published by Masson and more precisely to pages 343 and 344.

The input EMA1 is connected to the output of a multiplexer 270 having two inputs for 16-bit signals. The input EMA1 is connected to the 16 output wires of this multiplexer controlled by a signal MUX1. The input EMB1 is also connected to the output of a multiplexer 272 controlled by a signal MUX2, provided with two inputs for 16-bit signals but here the EMB1 input is connected to four output wires of this multiplexer; these four wires transmit the least significant bits of the number available at the output of multiplexer 272. Input EMB2 receives the four highest significant bits of this number via a delay unit 275 inserting a delay TT, the input EMB3 receives the four following bits via two delay units 276 and 277 each inserting a delay of TT and input EMB4 the last four bits of highest significance via three delay units 278, 279 and 280, these also inserting a delay TT. Inputs EMA2, EMA3 and EMA4 are respectively connected to the outputs of the delay units 281, 282 and 283 connected in cascade at the output of multiplexer 270; these devices also each inject a delay TT.

The outputs of the multiplication units are divided into two parts, one part called PL1, PL2, PL3 and PL4 for each of the multiplication sub-units respectively; these parts PL1 to PL4 transmit the four least significant bits coming from these sub-units and together form the 16 least significant bits Pr15 to Pr0 resulting from the multiplication. The presence of delay units 285, 286 and 287 for part PL1, 288, 289 for PL2 and 290 for PL3 should however be noted, each of these units inserting a delay of TT. The other outputs of the second part are called PM1, PM2, PM3 and PM4 for each of the sub-units 261, 262, 263 and 264. These outputs transmit 16 bits. The output signals PM1, PM2, PM3 are applied to sub-units 262, 263 and 264 respectively. The outputs PM4 represent the most significant bits Pr31 to Pr16 of the result of the multiplication. A two input multiplexer 320 selects either bits Pr31 to PR16 when set to "F", or bits Pr15 to Pro when set to "f"; this selection depends on a control signal MUX3. The output of this multiplexer is connected to one of two inputs of a multiplexer 322 receiving a control signal MUX4 for setting it to "0" or "A", to a register 324 the recording control of which receives a signal LRMT and finally to one of the two inputs of a multiplexer 325 receiving the setting control signal SP. The other input of the multiplexer 322 permanently receives the number "0" in 16 bits; when set to "0" this number "0" appears at its output while when set to "A" it is the number coming from multiplexer 320 which is present there. The outputs of multiplexer 322 and of register 324 are connected to the (−) and (+) inputs respectively of an addition-subtraction unit 326 provided with a control receiving a "+/−" signal for setting it in the addition or subtraction state, i.e. from the number present at the output of register 324 is subtracted the number present at the output of multiplexer 322. The output of this unit 326 is connected on the one hand via multiplexer 325 to a register 328 receiving a record control signal LPR and on the other hand to a register 330 receiving a record control signal LPI. The outputs of these registers are connected to the two inputs of a multiplexer 335 provided with a control receiving a signal MUX5 for setting it to "R" and its output is connected to register 328, or to "I" when its output is connected to register 330. The output of multiplexer 335 forms the output 254 of the multiplication unit 250.

Before being processed by the multiplication unit the operands at inputs 252 and 253 transit through series of registers. Input 252 is connected on the one hand to a register 350 and on the other hand to a set of two registers 352 and 354 connected in cascade; registers 350 and 352 respectively receive the record control signals coming from an "AND" gate 355 and an "AND" gate 356. The record control signal of register 352 is signal LaT. AND gate 355 receives on its inputs the signal ∅0 and a signal CRX' while the AND gate 356 receives the signal ∅3 and a signal CRX.

The outputs of registers 350 and 354 are connected to the two inputs of multiplexer 270 controlled by the signal MUX1 to set it to "a" or to "b". When set to "a" the output of the multiplexer is connected to register 354 and set to "b" this output is connected to register 350. In the same way input 253 is connected on the one hand to a register 360 and on the other hand to a set of two registers 362 and 364 connected in cascade; registers 360, 362 respectively receive the record control signals coming from an "AND" gate 365 and an "AND" gate 366. The record control signal of register 362 is the signal LaT. AND gate 365 receives on its inputs the signal ∅0 and a signal CRY' while the AND gate 366 receives the signal ∅3 and a signal CRY. The outputs of registers 360 and 364 are connected to the two inputs of multiplexer 272. This multiplexer 272 is controlled by a signal MUX2 to set it to "a" or to "b". When set to "a" the output of the mutiplexer is connected to register 364 and when set to "b" to register 360. The various signals LaT, CRX, CRX', CRY, CRY', MUX1, MUX2, MUX1', MUX2', MUX3, MUX4, MUX5, "+/−", LPI and LPR are produced by means of a control circuit 380 and delay units 381, 382, 383 and 384. This circuit carries out the following functions depending on a multiplication command code CMU. This multiplication command code is located in bits 20 and 21 of an OPIN type instruction characterized by bits No. 0 and No. 1 being equal to "0". The code CMU can take four values and Table VIII gives its various possibilities.

TABLE VIII

| CMU | | |
|---|---|---|
| I20 | I21 | |
| 0 | 0 | The former values of the operand are retained. |
| 1 | 0 | The BUSX operand is recorded, the BUSY operand ignored. |
| 0 | 1 | The BUSX operand is ignored, the BUSY operand recorded. |
| 1 | 1 | The BUSX and BUSY operands are recorded. |

Control circuit 380 therefore provides the various control signals depending on the following logic equations:

$$LaT = \emptyset 2$$

$$CRX = \overline{I0} \cdot \overline{I1} \cdot I20$$

$$CRY = \overline{I0} \cdot \overline{I1} \cdot I21$$

$$MUX1' = \emptyset 0 + \emptyset 3 + \overline{CX}$$

$$MUX2' = \emptyset 0 + \emptyset 2 + \overline{CX}$$

$$MUX3 = (\emptyset 0 + \emptyset 3) \cdot DP$$

$$MUX4 = CX \text{ ti } MUX5 = \emptyset 1 + \emptyset 2$$

$$"+/-" = (\emptyset 0 + \emptyset 3) \cdot CX$$

$$LPI = \emptyset 3 \cdot \overline{SP}$$

$$LPR = (\emptyset 1 \cdot \overline{SP}) + (\emptyset 0 \cdot SP)$$

Units 381, 382 are transfer flip-flops which act on phase ∅1 to delay the signals CRX and CRY in order to provide the signals CRX' and CRY'. Units 383 and 384 contribute a delay of TT/2 to the signals MUX1' and MUX2' in order to provide signals MUX1 and MUX2. The value "1" of MUX1 and MUX2 indicates that setting "b" is considered and the value "0", setting "a". The value "1" for MUX3 indicates that setting "F" is considered, the value "0", setting "f". The value "1" for MUX4 indicates that setting "0" is considered and the value "0" setting "A". The value "1" of MUX5 indicates setting "R" is considered and the value "0", setting "I". When "+/−" equals 1 it is the (−) sign which is to be considered and when "+/−" equals 0 it is the (+) sign.

It is good to specify the characteristics of sub-units 261, 262, 263 and 264.

Sub-units 261, 262 and 263 carry out 5 bits×16 bits operations in twos complement. The sign bit of the 5-bit operand is forced to "0". These sub-units provide 20 bits at their outputs.

Sub-unit 264 carries out 4 bits×16 bits operations in twos complement with 19 bits at the output. If we call the operands S and P, the indexes allocated to them represent the positions of the bits; we can then write:

$$\left[\left(-S_o + \sum_{i=1}^{3} S_i 2^{-i}\right) + \left(2^{-4} \sum_{i=0}^{3} S_{i+4} 2^{-i}\right) + \right.$$

$$\left. (2^{-8} \Sigma S_{i+8} \cdot 2^{-i}) + \left(2^{-12} \sum_{i=0}^{3} S_{i+12} \cdot 2^i\right)\right] \times$$

$$\left[-P_o + \sum_{i=1}^{15} P_i \cdot 2^{-i}\right]$$

$P_o$ and $S_o$ represent the sign bits. The first sum between brackets relates to sub-unit 264 and therefore includes 4 bits.

It will be noted that buffer registers 401, 402 and 403 are inserted between sub-units 261 and 262, 262 and 263, and 263 and 264; these units are activated by a signal H provided by circuit 60; this signal H has a period equal to TT.

Figure 12:
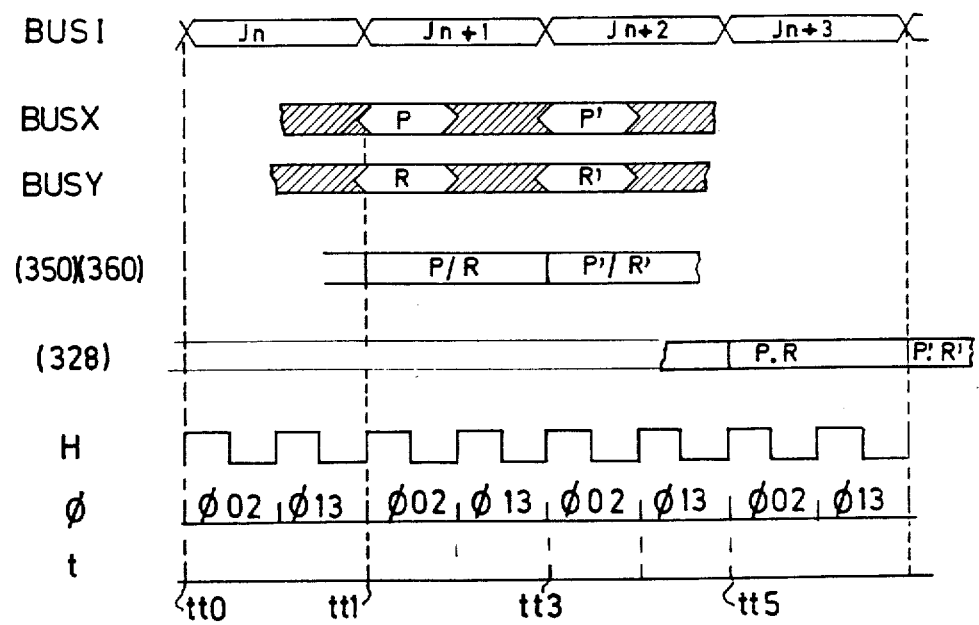
FIG. 12 is a timing diagram showing the operation of the multiplication unit in single precision mode.
Figure 13:
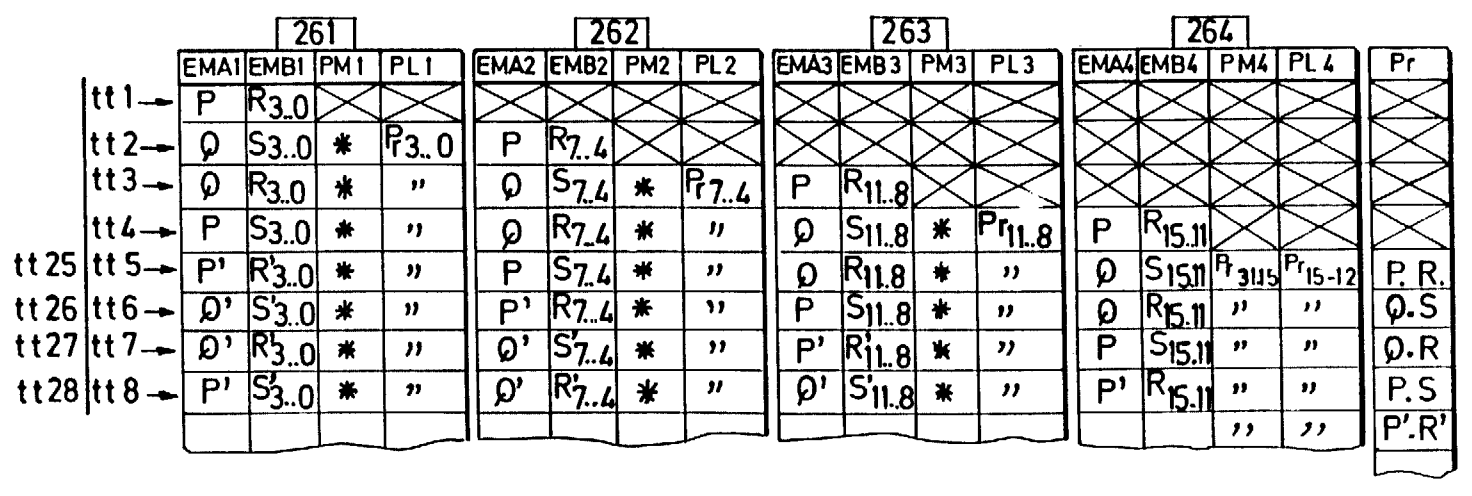

First we examine the operation of the multiplication unit 250 in single precision mode. For this we refer to FIGS. 12 and 13.

Consider time tt0 (FIG. 12) at which an instruction Jn appears on the BUSI line involving a multiplication. Operands P and R then appear on the BUSX and BUSY lines respectively at time tt1, the signal at the outputs of gates 355 and 365 becomes active and operands P and R appear at the output of multiplexers 270 and 272 appropriately switched by signals MUX1 and MUX2. Sub-unit 261 immediately begins the first partial multiplication with operand P and the 4 bits R3 . . . 0 of operand R of which the result appears after a time TT. Consider time tt2 (FIG. 13); the least significant bits Pr3 . . . 0 are already calculated and appear at the output PL1 (see box numbered 261 in FIG. 13). However this result will only be made available after a delay equal to the sum of each of the delays of units 300, 301 and 302.

At time tt2 the sub-unit 262 begins the second partial multiplication. Operand P is still found at the input of EMA2 and bits R7 . . . 4 are at the input EMB2. Bits Pr7 . . . 4 appear after a time period of TT. (see box 262, FIG. 13).

At time tt3, operand P and bits R11 . . . 8 of operand R appear at inputs EMA3 and EMB3. The result (bits Pr11 . . . 8) is provided after time TT (box 263, FIG. 12 (sic)).

At time tt4, operand P and bits R15 . . . 12 appear at inputs EMA4 and EMB4 of sub-unit 264. The complete result of the multiplication appears on the one hand at output PM4 of multiplication sub-unit 264 and at the various outputs PL1, PL2, PL3, PL4 each being connected to an appropriate number of delay units. But it should be noted that in single precision mode, only binary elements Pr31 . . . 16 are considered. For this multiplexer 320 receives the signal MUX3 which sets it up so that register 328 is put into communication with output PM4. At time tt5, the signal LPR becomes active and the result of the multiplication is made available at output 254 via multiplexer 335 set to "R" by the signal MUX5. It is appropriate to note that, even though the multiplication is triggered by the instruction Jn, its result is only available two instructions later, i.e. for instruction Jn+2. This must be taken into account when programming the processor of the invention.

We will now examine the operation of the multiplication unit 250 in complex mode. We therefore propose explaining the way in which the multiplication is carried out:

$$(P+jQ)\times(R+jS)$$

the result of which is obviously:

$$[(P\times R)-(Q\times S)]+j[(Q\times R)+(P\times S)]$$

This implies that it is therefore necessary to make four multiplications P×R; Q×S; Q×R and P×S.

For this explanation we again refer to FIG. 13 and to FIG. 14.

It is appropriate to mention that the real parts transit through registers 352 and 354 and the imaginary part through register 350 as regards one operand. For the other operand the real parts transit through registers 362 and 364 and the imaginary part through register 360.

At time tt10 (FIG. 14) the instruction JJn appears which involves a multiplication in complex mode. At time tt11 the operands P and R are available on the BUSX and BUSY lines respectively. These operands are immediately loaded into registers 352 and 362 which is indicated on the lines referenced (352) and (362) in FIG. 14. At time tt12, distanced by a time TT, the operands P and R are transferred from register 352 or 362 to register 354 or 364. The multiplexers 270 and 272 being already set to position "a" by the signals MUX1 and MUX2 of appropriate value, the multiplication P×R is started and progresses according to FIG. 13 and at the same rate as in single precision mode. At time tt13 the purely imaginary operands jQ and jS appear on the BUSX and BUSY lines. These are loaded into registers 350 and 360, the multiplication begins, multiplexers 270 and 272 being set to position "b". In order to carry out the multiplication Q×R, the multiplexer 272 is set to position "a" at time tt13+TT/2 and in order to carry out the multiplication P×S the multiplexer 272 is set to position "a", the multiplexer 270 remaining in position "b". At time tt15 new operands P' and R' can appear for a multiplication in complex mode. This operation is started after a time TT without waiting for the previous multiplication to be completed. At time tt25, the result of the multiplication P×R is available at outputs Pr31 . . . 16 of the multiplication sub-units. This result is loaded into register 324, multiplexer 320 being in position "F" during all the complex mode operations. At time tt26 the Q×S result appears; this result is applied via multiplexer 322 to the negative input of the addition-subtraction unit which has been set to the subtraction position at time tt25. The output data from this unit represents the quantity PR-QS which is the real part of the multiplication. This result is loaded into register 328 at time tt27. At this time tt27, bits Pr31 ... 16 represent the quantity Q×R which is immediately loaded in register 324 and unit 325 is set to the addition position. Then at time tt28 the value P×S is calculated such that at time tt29 the imaginary part j[(Q×R)+(P×S)] can be loaded into register 330. Multiplexer 335 makes available at output 254 the real part contained in register 328 during phases ∅1 and ∅2 and the imaginary part contained in register 330 during phases ∅3 and ∅0.

Thus account is taken of the fact that the result of the complex multiplication triggered by instruction JJn is made available two instructions later at instruction JJn+2.

Finally we explain the operation of the multiplication unit in double precision mode. In this case the operands appear systematically two times in 16 bits. At a first time the least significant bits (p and r respectively) are transmitted and at a second time the most significant bits (P and R respectively) are transmitted. In fact, as will be seen by the following, the multiplication unit 250 ignores the least significant bits and carries out the operation on the most significant bits. However the result (in 32 bits) is provided at output 254 at two times i.e. two times 16 bits. It will be noted that the least significant bit is not significant and that in fact we only consider 31 bits.

At time tt30 (see FIG. 15) the instruction JKn appears which involves a multiplication operation in double precision mode. At time tt31 the least significant bits p and r of the operands appear on the BUSX and BUSY lines; these are ignored. The most significant bits P and R appearing on these same lines at time tt32 are loaded into registers 350 and 360 respectively, the expected result occurring at time tt33. By means of an appropriate command (MUX3) applied to multiplexer 320 register 324 is connected to the least significant bits Pr15 ... 0 of the result of the multiplication. The least significant bits are loaded in it and then these same least significant bits are loaded into register 328 at time tt34. At that same time multiplexer 320 is set to its other position i.e. position "F" such that register 324 can load the most significant bits Pr31 ... 16. These most significant bits are then loaded in register 330 at time tt35. In order to make these various data available at output 254 the multiplexer periodically connects output 254 in turns to registers 328 and 330 (time tt33 and tt34).

As for the other modes, the product started by instruction JKn is available two instructions later at instruction JKn+2.

What is claimed is:

1. A processor for executing a plurality of data processing operations which constitute either a single precision, double precision, or complex number mode comprising:
   a program memory for containing a plurality of instructions;
   an instruction register for receiving instructions from said program memory;
   a data memory;
   an arithmetic logic unit connected by a data bus to said data memory;
   a control code and borrow management circuit connected to said arithmetic logic unit, and connected by an instruction but to said instruction register, whereby an instruction from said register controls said control code and borrow management circuit;
   a clock pulse generator connected to said control code and borrow management circuit, said clock pulse generator producing a different clock cycle for each of a plurality of modes in response to mode control signals;
   a mode circuit connected to said instruction bus, said mode circuit detecting a declaration instruction in said instruction register, said mode circuit generating mode control signals in response to a declaration instruction, and applying said mode control signals to said clock pulse generator for changing said clock cycle, and to said control code and borrow management circuit, so that under control of said clock pulses, mode control signals, and instruction register, said arithmetic logic unit carries out one or more operations constituting a mode on data supplied from said data memory; and
   wherein the arithmetic logic unit is coupled to a first data bus via a binary shifter unit, and upon receipt of an instruction by the control code and borrow management circuit, said circuit generates upon receipt of a clock pulse cycle one or more unit control words according to declaration instructions for controlling the arithmetic logic unit, and the binary shifter unit, so that one or more operations defined by said one or more unit control words respectively are executed.

2. A processor for data processing in a mode selected from a number of different processing modes according to claim 1, wherein the control code and borrow management circuit has an input connected to said data memory via a data bus for receiving data, which are interpreted as an instruction for generating one or more unit control words in dependency of the declaration instruction.

3. A processor for data processing in a mode selected from a number of different processing modes according to one of the claims 1 or 2, comprising a multiplication device having a first and a second input connected to a first and second data memory via a first and a second data bus, respectively, and an output for applying multiplication results to an input of the arithmetic and logic unit, said multiplication device comprising a control circuit provided with a first, second and third input for receiving instructions from the instruction bus, mode control signals from the mode circuit and the clock pulse cycle from the clock pulse generator, respectively, for controlling the multiplication device in dependency of the declaration instruction.

4. A processor for data processing in a mode selected from a different mode according to claim 3, wherein the multiplication device comprises a multiplication unit, a first and a second input multiplexer and at least four input registers, the multiplication unit having a first and a second input connected to the first and second input multiplexer, respectively, said first and second multiplexer having inputs connected to a first and a second input register and a third and a fourth input register, respectively, said first and second input register and said third and fourth input register receiving data via the first and second data bus, respectively, the first and second multiplexer as well as the four input registers being controlled by the control circuit.

5. A processor for data processing in a mode selected from a number of different processing modes according to claim 1, wherein an addressing circuit for a data memory comprises a register for containing a memory address code, of which the least significant bit is replaced by at least a part of the clock pulse cycle during at least one of the different processing modes in order to read data from successive addresses.

6. A processor for data processing in a mode selected from a number of different processor modes according to claims 1, or 2, wherein the processor comprises a first and a second data memory, each of which have a first and a second output register, said first and second output registers being connected to a first and a second data input of the arithmetic and logic unit, respectively, via a first and second data bus, respectively.

7. A processor for data processing in a mode selected from a number of different processing modes, according to claim 5, wherein a third bus is provided, which connects an output of the arithmetic and logic unit to a first and second data input register of the first and second data memory, respectively.

8. A processor for data processing in a mode selected from a number of different processing modes according to claim 7, wherein the output of the arithmetic and logic device is connected to the third data bus via an output multiplexer, a second input of said output multiplexer being connected to the output of a status register, which stores the status of the arithmetic and logic unit, so as to transfer said status via said output multiplexer in one of the data memories.

9. A processor for data processing in a mode selected from a number of different processing modes according to claim 8, wherein a data bus is connected to a status management circuit, which receives the status output of the arithmetic and logic device, the mode control signals and a clock pulse cycle, an output of said status management circuit being connected to the status register in order to put data from the data bus in the status register by control of the mode control signals and the clock pulse cycle.

10. A processor for data processing in a mode selected from a number of different processing modes according to claim 4, wherein the multiplication device comprises a first and a second output register for storing two successive results of the multiplication unit operating in a double precision or complex mode, the outputs of said two output registers connected to an addition-subtraction unit, output results of which are applied successively to a third and a fourth output register, outputs of which are connected by turn to the output of the multiplication device via a multiplex circuit.

* * * * *